(12) United States Patent
Lee

(10) Patent No.: US 12,225,456 B2
(45) Date of Patent: Feb. 11, 2025

(54) METHOD AND APPARATUS FOR CELL SELECTION IN WIRELESS COMMUNICATION SYSTEM

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 17/905,281

(22) PCT Filed: Mar. 4, 2021

(86) PCT No.: PCT/KR2021/002670
§ 371 (c)(1),
(2) Date: Aug. 30, 2022

(87) PCT Pub. No.: WO2021/177739
PCT Pub. Date: Sep. 10, 2021

(65) Prior Publication Data
US 2023/0028393 A1 Jan. 26, 2023

Related U.S. Application Data

(60) Provisional application No. 63/106,360, filed on Oct. 28, 2020, provisional application No. 62/984,788, filed on Mar. 4, 2020.

(51) Int. Cl.
*H04W 48/20* (2009.01)
*H04W 64/00* (2009.01)

(52) U.S. Cl.
CPC ......... *H04W 48/20* (2013.01); *H04W 64/003* (2013.01)

(58) Field of Classification Search
CPC ........................ H04W 48/20; H04W 64/003
See application file for complete search history.

(56) References Cited

U.S. PATENT DOCUMENTS 8,989,748 B2  3/2015 Mueck et al.
9,112,267 B2 * 8/2015 Li ........................ H01Q 1/246
(Continued)

FOREIGN PATENT DOCUMENTS

CN     108024312 A  *  5/2018  ............ H04W 48/14
CN     118414554 A  *  7/2024  ............... G01S 5/02
(Continued)

OTHER PUBLICATIONS

PCT International Application No. PCT/KR2021/002670, International Search Report dated Jun. 18, 2021, 2 page.

*Primary Examiner* — Adam D Houston
(74) *Attorney, Agent, or Firm* — LEE, HONG, DEGERMAN, KANG & WAIMEY

(57) ABSTRACT

The present disclosure relates to cell selection in wireless communications. According to various embodiments, a method performed by a wireless device in a wireless communication system comprises: receiving, from each of a plurality of mobile cells, location information related to each of the plurality of mobile cells and identifier (ID) information related to each of the plurality of mobile cells; estimating a movement pattern of each of the plurality of mobile cells based on the location information and the identifier information; determining a mobile cell among the plurality of mobile cells for a cell selection based on the movement pattern; and performing the cell selection to the determined mobile cell.

15 Claims, 13 Drawing Sheets

(56) References Cited

U.S. PATENT DOCUMENTS

| | | | |
|---|---|---|---|
| 9,456,396 B2 * | 9/2016 | Liu | H04W 36/302 |
| 11,206,632 B2 * | 12/2021 | Qi | H04W 4/027 |
| 11,310,715 B2 * | 4/2022 | Kim | H04W 76/19 |
| 2003/0224790 A1 * | 12/2003 | Choi | H04W 36/302 |
| | | | 455/437 |
| 2005/0037798 A1 | 2/2005 | Yamashita et al. | |
| 2008/0014944 A1 * | 1/2008 | Choi | H04W 36/302 |
| | | | 455/436 |
| 2010/0330943 A1 | 12/2010 | Hoepfner | |
| 2011/0230179 A1 * | 9/2011 | Lee | H04W 48/20 |
| | | | 455/422.1 |
| 2015/0141025 A1 * | 5/2015 | Larsson | H04W 84/005 |
| | | | 455/448 |
| 2015/0163711 A1 | 6/2015 | Norman et al. | |
| 2018/0146410 A1 | 5/2018 | Cho et al. | |
| 2020/0314793 A1 * | 10/2020 | Kumar | G01S 19/48 |
| 2023/0028393 A1 * | 1/2023 | Lee | H04W 64/003 |

FOREIGN PATENT DOCUMENTS

| | | | | |
|---|---|---|---|---|
| EP | 1411741 A1 * | 4/2004 | | H04W 36/04 |
| JP | 2023549106 A * | 11/2023 | | |
| JP | 7474878 B2 * | 4/2024 | | H04B 7/18513 |
| WO | 2015-074808 | 5/2015 | | |
| WO | WO-2018031084 A1 * | 2/2018 | | G01C 21/206 |
| WO | WO-2020149631 A1 * | 7/2020 | | H04W 36/30 |
| WO | WO-2021177739 A1 * | 9/2021 | | H04W 48/20 |

* cited by examiner

METHOD AND APPARATUS FOR CELL SELECTION IN WIRELESS COMMUNICATION SYSTEM

CROSS-REFERENCE TO RELATED APPLICATION(S)

This application is the National Stage filing under 35 U.S.C. 371 of International Application No. PCT/KR2021/002670, filed on Mar. 4, 2021, which also claims the benefit of U.S. Provisional Application No. 62/984,788, filed on Mar. 4, 2020, and 63/106,360, filed on Oct. 28, 2020, the contents of which are all hereby incorporated by reference herein in their entireties.

TECHNICAL FIELD

The present disclosure relates to cell selection in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communication, cell selection and reselection may be required due to a mobility of a user equipment (UE). The UE may perform a cell selection/reselection to a cell related to a RAN node whose geographical location is fixed. The UE may also perform a cell selection/reselection to a mobile cell (VMR, V-IAB node, or mobile base station relay) whose geographical location varies due to a mobility of the mobile cell.

SUMMARY

1. Technical Problem

An aspect of the present disclosure is to provide a method and apparatus for a cell selection in a wireless communication system.

Another aspect of the present disclosure is to provide a method and apparatus for performing a cell selection to a cell among a plurality of mobile cells in a wireless communication system.

Another aspect of the present disclosure is to provide a method and apparatus for performing a cell selection to a VMR or a V-IAB node or mobile base station relay in a wireless communication system.

Another aspect of the present disclosure is to provide a method and apparatus for performing a cell selection by a UE in a VMR in a wireless communication system.

2. Technical Solution

According to various embodiments, a method performed by a wireless device in a wireless communication system comprises: receiving, from each of a plurality of mobile cells, location information related to each of the plurality of mobile cells and identifier (ID) information related to each of the plurality of mobile cells; estimating a movement pattern of each of the plurality of mobile cells based on the location information and the identifier information; determining a mobile cell among the plurality of mobile cells for a cell selection based on the movement pattern; and performing the cell selection to the determined mobile cell.

According to various embodiments, a wireless device in a wireless communication system comprises: a transceiver; a memory; and at least one processor operatively coupled to the transceiver and the memory, and configured to: control the transceiver to receive, from each of a plurality of mobile cells, location information related to each of the plurality of mobile cells and identifier (ID) information related to each of the plurality of mobile cells; determine a movement pattern of each of the plurality of mobile cells based on the location information and the identifier information; determine a mobile cell among the plurality of mobile cells for a cell selection based on the movement pattern; and perform the cell selection to the determined mobile cell.

According to various embodiments, a processor for a wireless device in a wireless communication system is configured to control the wireless device to perform operations comprising: receiving, from each of a plurality of mobile cells, location information related to each of the plurality of mobile cells and identifier (ID) information related to each of the plurality of mobile cells; determining a movement pattern of each of the plurality of mobile cells based on the location information and the identifier information; determining a mobile cell among the plurality of mobile cells for a cell selection based on the movement pattern; and performing the cell selection to the determined mobile cell.

According to various embodiments, a computer-readable medium having recorded thereon a program for performing each step of a method on a computer is provided. The method comprises: receiving, from each of a plurality of mobile cells, location information related to each of the plurality of mobile cells and identifier (ID) information related to each of the plurality of mobile cells; determining a movement pattern of each of the plurality of mobile cells based on the location information and the identifier information; determining a mobile cell among the plurality of mobile cells for a cell selection based on the movement pattern; and performing the cell selection to the determined mobile cell.

According to various embodiments, a method performed by a mobile relay node in a wireless communication system comprises: transmitting, to a wireless device, location information related to the mobile relay node and identifier (ID) information related to the mobile relay node, wherein the wireless device is configured to: determine a movement pattern of the mobile relay node based on the location information and the ID information; determine a mobile relay node among a plurality of mobile relay nodes including the mobile relay node for a cell selection based on a movement pattern of each of the plurality of mobile relay nodes; and perform the cell selection to the determined mobile relay node.

According to various embodiments, a mobile relay node in a wireless communication system comprises: a transceiver; a memory; and at least one processor operatively coupled to the transceiver and the memory, and configured to: control the transceiver to transmit, to a wireless device, location information related to the mobile relay node and identifier (ID) information related to the mobile relay node, wherein the wireless device is configured to: determine a movement pattern of the mobile relay node based on the location information and the ID information; determine a mobile relay node among a plurality of mobile relay nodes including the mobile relay node for a cell selection based on a movement pattern of each of the plurality of mobile relay nodes; and perform the cell selection to the determined mobile relay node.

3. Advantageous Effect

The present disclosure may have various advantageous effects.

For example, mobility management can be optimized by considering a cell selection/reselection based on history information/movement pattern between a VMR and a UE in the VMR.

For example, load balancing can be achieved by adaptively overcoming an unbalanced geographic distribution of traffic demand due to a mobility of VMRs and UEs in the VMR.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
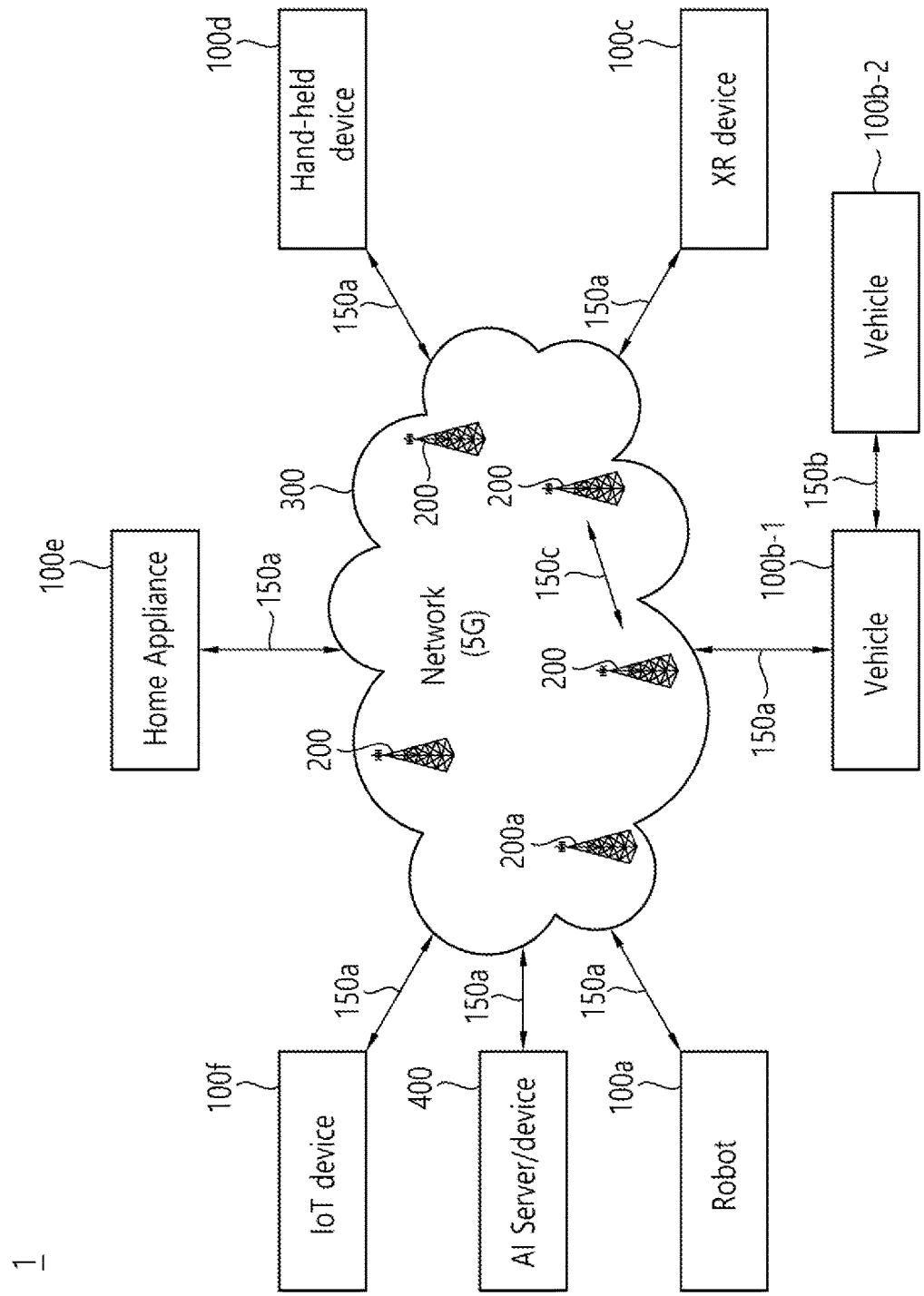
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

"Integrated access and backhaul (IAB)" refers to a scheme in which a part of a wireless spectrum is used for backhaul connection of base stations instead of fiber (i.e., wireless backhaul). The IAB node may be a kind of a wireless device.

"IAB node" refers to a RAN node that supports wireless access to user equipments (UEs) and wirelessly backhauls the access traffic. The IAB node and the UE may be a kind of a wireless device.

"Vehicle-mounted relay (VMR)" refers to a mobile version of IAB-node mounted in a vehicle. The VMR is a kind of a mobile cell. The VMR may be also referred to as "vehicle IAB node (V-IAB node)", mobile base station relay, and/or mobile relay node.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable by reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
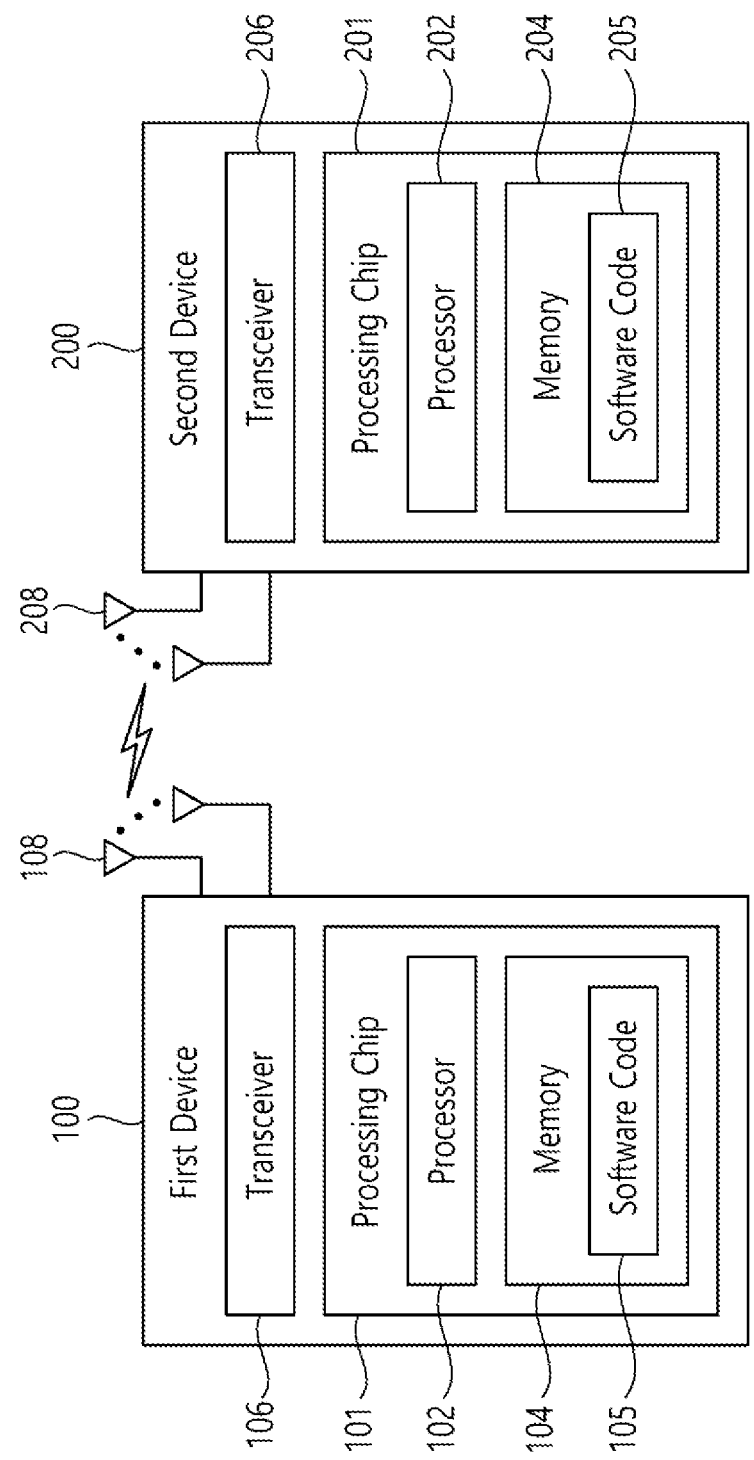
FIG. 2 shows an example of wireless devices to which implementations of the present disclosure is applied.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
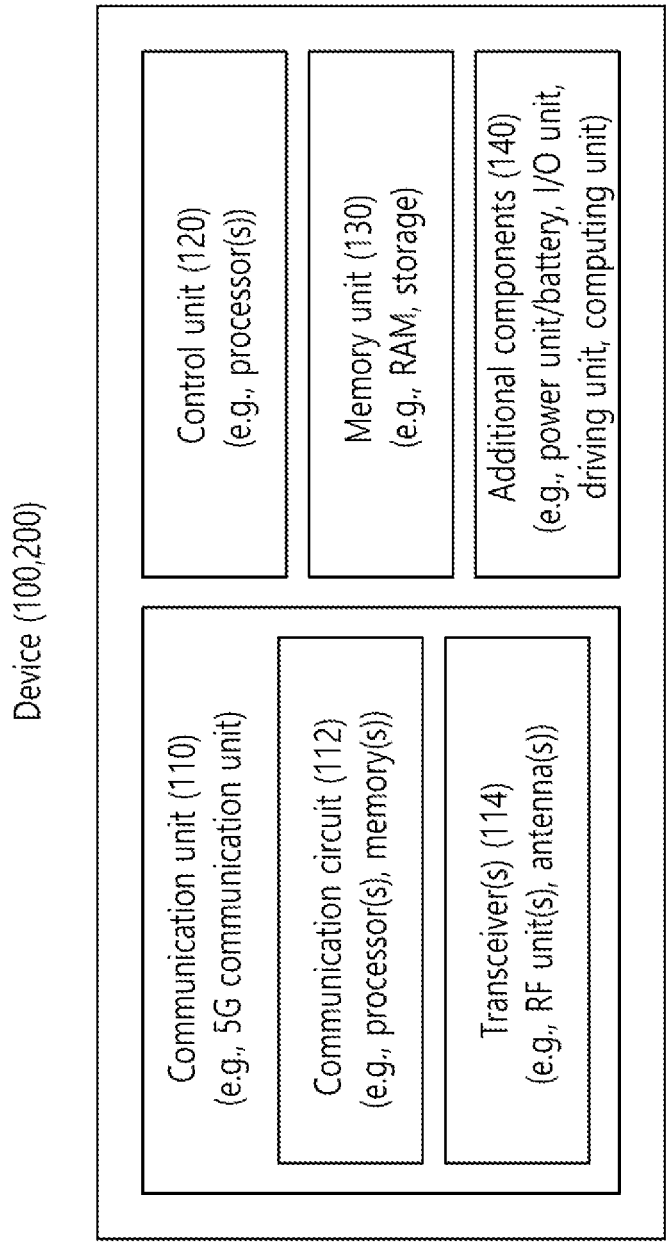
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
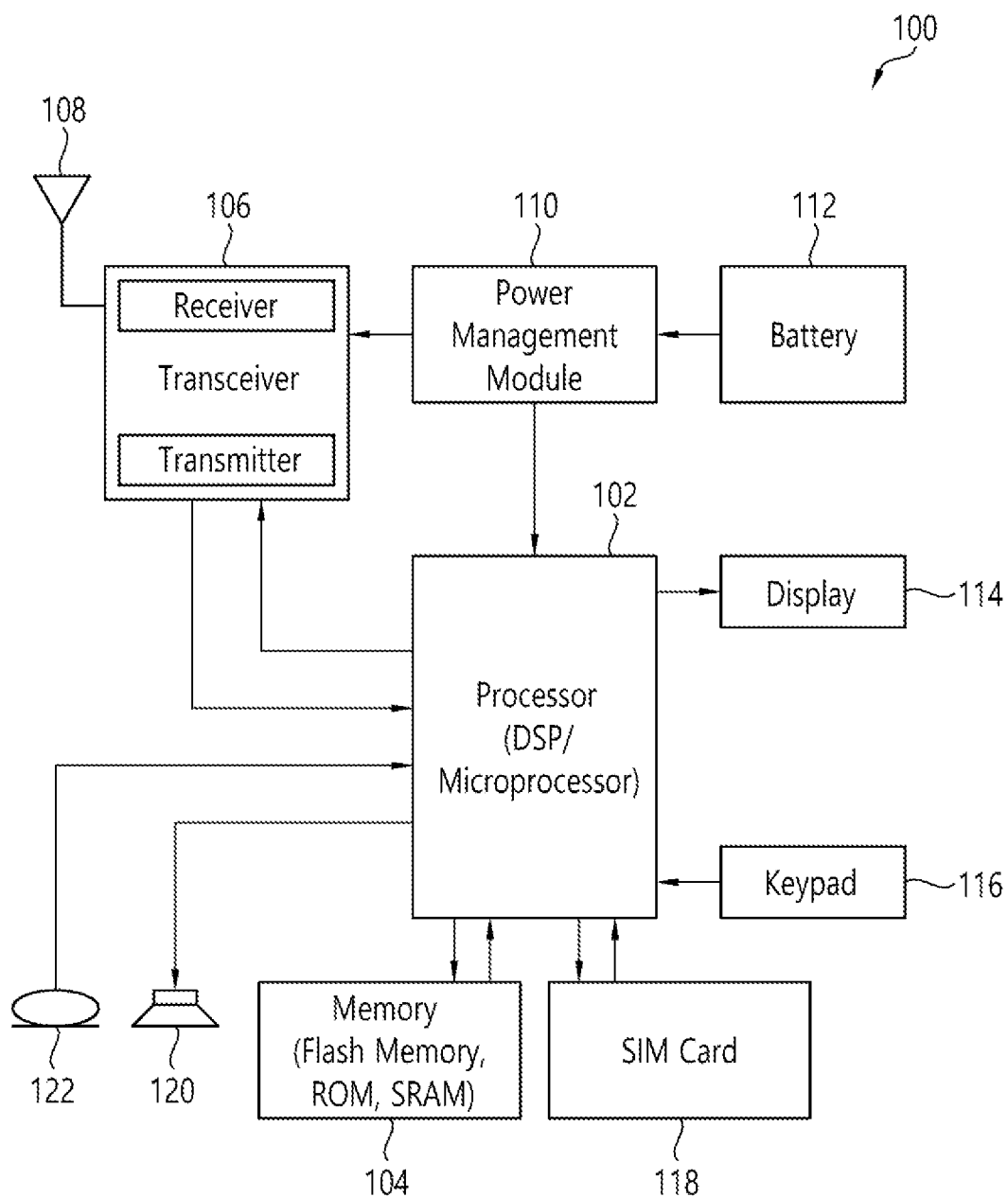
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
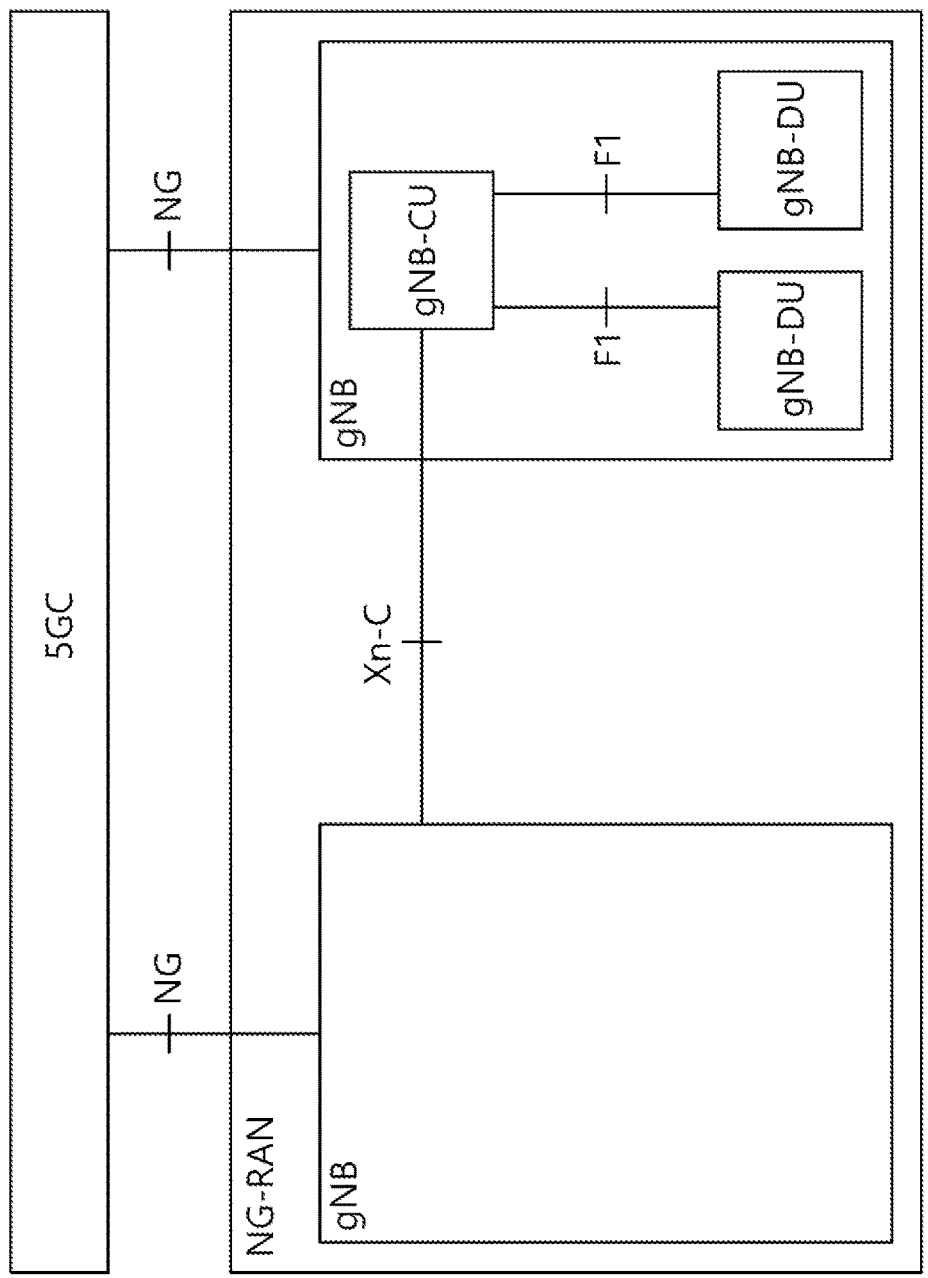
FIG. 5 shows an example of the overall architecture of an NG-RAN to which technical features of the present disclosure can be applied.

FIG. 5 shows an example of the overall architecture of an NG-RAN to which technical features of the present disclosure can be applied.

Referring to FIG. 5, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 6:
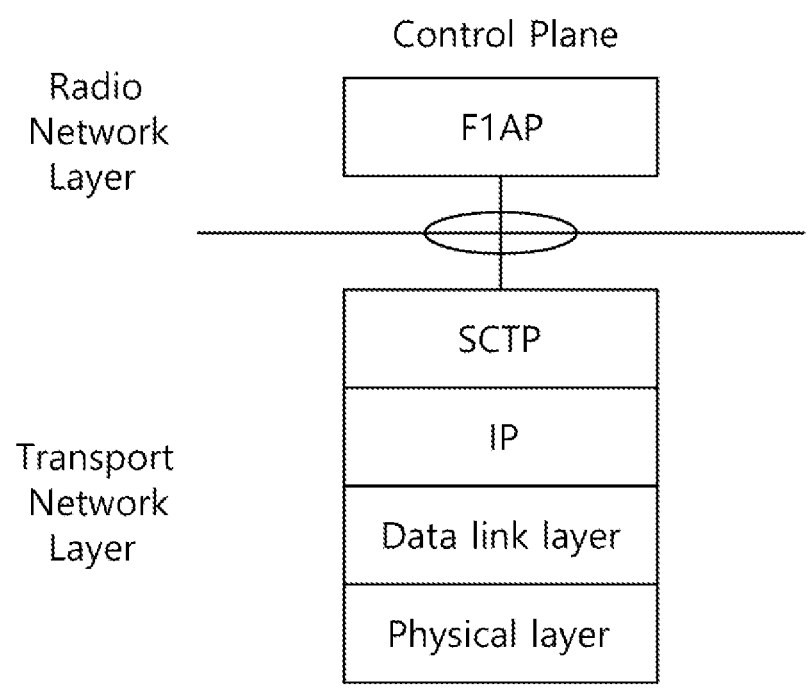
FIG. 6 shows an interface protocol structure for F1-C to which technical features of the present disclosure can be applied.

FIG. 6 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Figure 7:
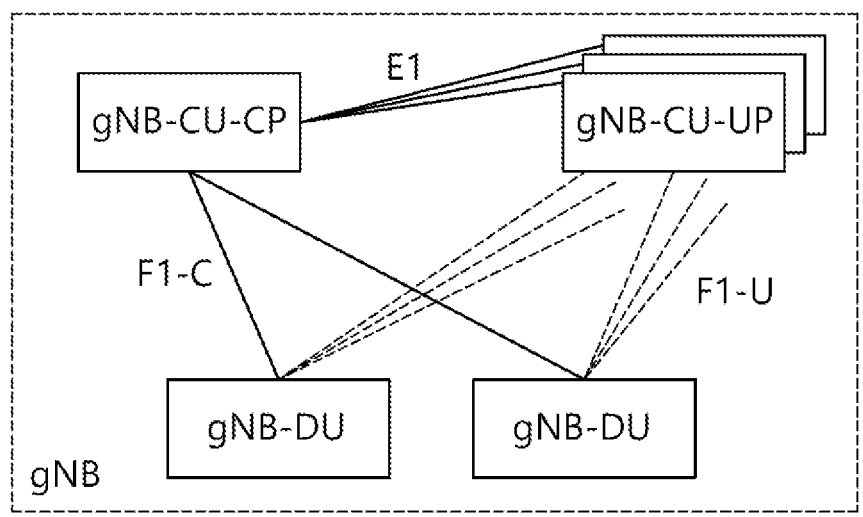
FIG. 7 shows an example of overall architecture for separation of gNB-CU-control plane (gNB-CU-CP) and gNB-CU-user plane (gNB-CU-UP) to which technical features of the present disclosure can be applied.

FIG. 7 shows an example of overall architecture for separation of gNB-CU-control plane (gNB-CU-CP) and gNB-CU-user plane (gNB-CU-UP) to which technical features of the present disclosure can be applied.

Referring to FIG. 7, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 7, the following properties may hold:

(1) A gNB-DU may be connected to a gNB-CU-CP.
(2) A gNB-CU-UP may be connected to a gNB-CU-CP.
(3) A gNB-DU can be connected to multiple gNB-CU-UPs under the control of the same gNB-CU-CP (i.e., the gNB-CU-CP to which the gNB-DU is connected and the multiple gNB-CU-UPs are connected).
(4) A gNB-CU-UP can be connected to multiple DUs under the control of the same gNB-CU-CP (i.e., the gNB-CU-CP to which the gNB-CU-UP is connected and the multiple DUs are connected).

Figure 8:
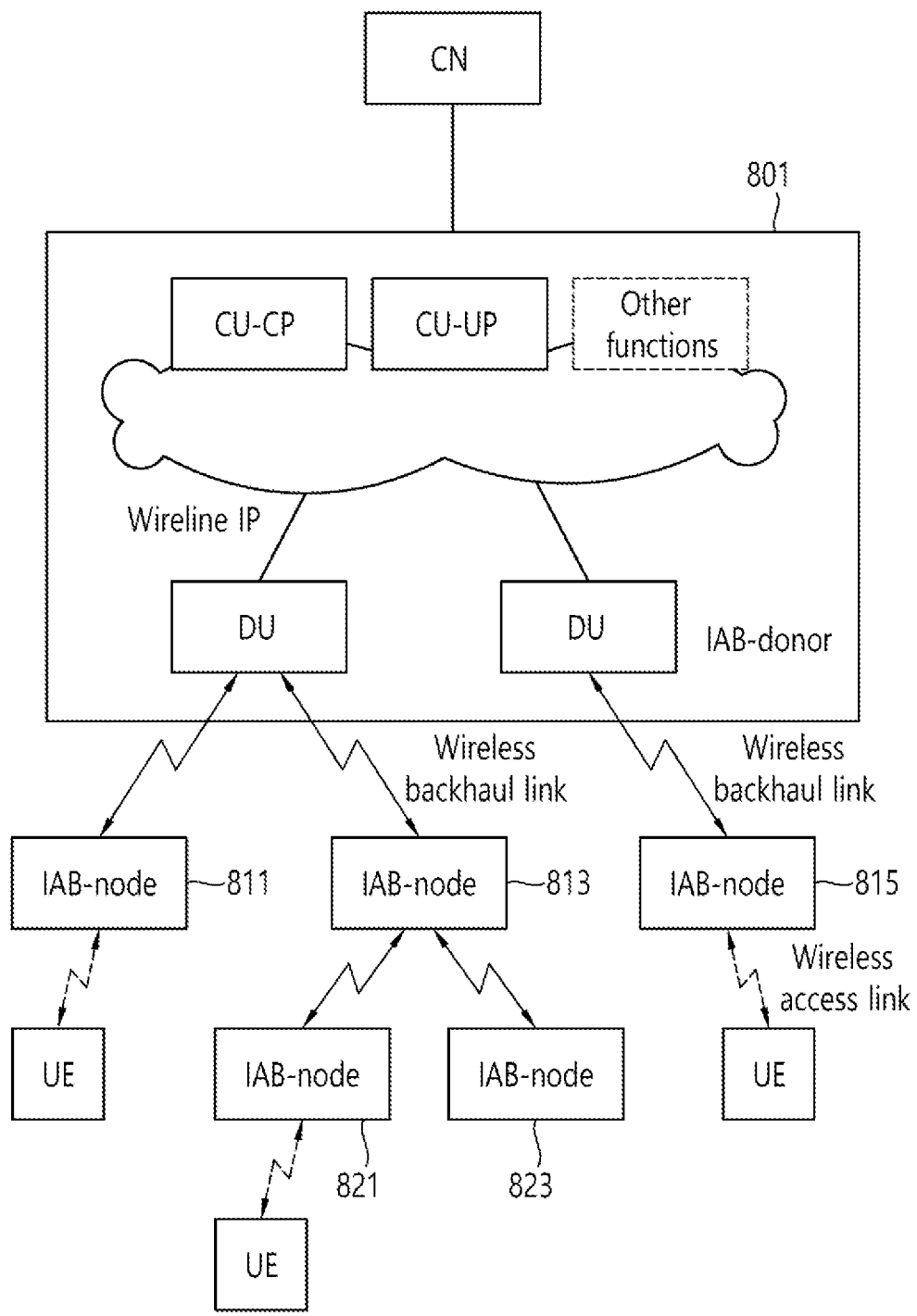
FIG. 8 shows an example of IAB topology to which technical features of the present disclosure can be applied.

FIG. 8 shows an example of IAB topology to which technical features of the present disclosure can be applied.

Referring to FIG. 8, the IAB topology may comprise an IAB donor 801 and multiple IAB nodes 811, 813, 815, 821 and 823. "IAB donor node (or, simply IAB donor)" refers to a RAN node which provides UE's interface to core network (CN) and wireless backhauling functionalities to IAB nodes. The IAB donor 801 may be treated as a signal logical node that may comprise a set of functions such as DU, CU-CP, CU-UP and potentially other functions. In a deployment, the IAB donor can be split according to these functions, which can all be either collocated or non-collocated. Also, some of the functions presently associated with the IAB donor may eventually be moved outside of the IAB donor in case it becomes evident that the functions do not perform IAB-specific tasks.

The IAB donor 801 may be connected to the IAB node 811, 813 and 815 via wireless backhaul link, and may communicate with the IAB node 811, 813 and/or 815 via the wireless backhaul link. For example, DUs of the IAB donor 801 may be used to communicate with the IAB nodes 811, 813 and/or 815 via wireless backhaul link. Each of the IAB node 811 and 815 may communicate with a UE served by itself via wireless access link. Further, the IAB donor 801 may be a parent node for the IAB node 811, 813 and 815, and the IAB node 811, 813 and 815 may be a child node for the IAB donor 801. The definition of the parent node and the child node will be described later.

The IAB node 813 may be connected to IAB node 821 and 823 via wireless backhaul link, and may communicate with the IAB node 821 and/or 823 via wireless backhaul link. The IAB node 821 may communicate with a UE served by itself via wireless access link. Further, the IAB node 813 may be a parent node for the IAB node 821 and 823, and the IAB node 821 and 823 may be a child node for the IAB node 813.

The IAB nodes 811, 813 and 815 may directly communicate with IAB donor 801 via wireless backhaul link. Therefore, the distance between the IAB donor 801 and each of the IAB nodes 811, 813 and 815 may be expressed as 1-hop distance. The IAB donor 801 may be 1-hop parent node for the IAB nodes 811, 813 and 815, and the IAB nodes 811, 813 and 815 may be 1-hop child node for the IAB donor 801.

The IAB nodes 821 and 823 may communicate with the IAB donor 801 via a first wireless backhaul link and a second wireless backhaul link. The first wireless backhaul link may be a wireless backhaul link between i) the IAB node 813 ii) the IAB nodes 821 and/or 823. The second wireless backhaul link may be a wireless backhaul link between the IAB node 813 and the IAB donor 801. Therefore, the distance between the IAB donor 801 and each of the IAB nodes 821 and 823 may be expressed as 2-hop distance. The IAB donor 801 may be 2-hop parent node for the IAB nodes 821 and 823, and the IAB nodes 821 and 823 may be 2-hop child node for the IAB donor 801. In a similar way, N-hop distance may be defined between arbitrary IAB nodes (including or not including IAB donor), and thus, N-hop parent node and N-hop child node may also be defined.

Figure 9:
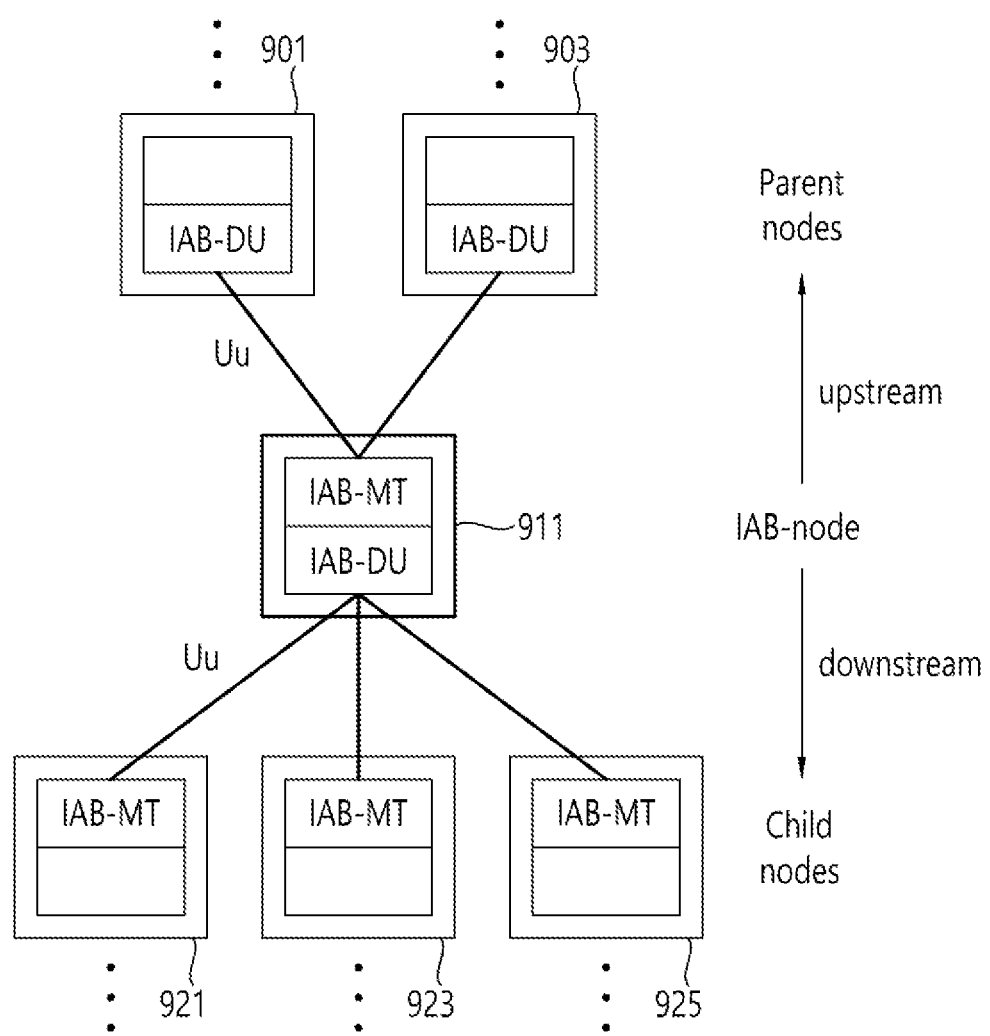
FIG. 9 shows a parent and child node relationship for IAB node to which technical features of the present disclosure can be applied.

FIG. 9 shows a parent and child node relationship for IAB node to which technical features of the present disclosure can be applied.

Referring to FIG. 9, an IAB node 911 may be connected to parent nodes 901 and 903 via wireless backhaul links, and may be connected to child nodes 921, 923 and 925 via wireless backhaul links. Throughout the disclosure, "parent IAB node (or, simply parent node)" for an IAB node may be defined as a next hop neighbor node with respect to an IAB-mobile termination (IAB-MT, or simply MT) of the IAB node. That is, the neighbor node on the IAB-MT's interface may be referred to as a parent node. The parent node can be IAB node or IAB donor-DU. Further, "child IAB node (or, simply child node)" for an IAB node may be defined as a next hop neighbor node with respect to an IAB-DU (or, simply DU) of the IAB node. That is, the neighbor node on the IAB-DU's interface may be referred to as a child node.

IAB-MT may refer to an IAB node function that terminates the Uu interface to the parent node. IAB-DU may refer to a gNB-DU functionality supported by the IAB node to terminate the access interface to UEs and next-hop IAB nodes, and/or to terminate the F1 protocol to the gNB-CU functionality on the IAB donor.

The direction toward the child node may be referred to as downstream while the direction toward the parent node may be referred to as upstream. Further, a backhaul link between an IAB node and a parent node for the IAB node may be referred to as upward backhaul link for the IAB node. A backhaul link between an IAB node and a child node for the IAB node may be referred to as downward backhaul link for the IAB node. A backhaul link for an IAB node may comprise at least one of an upward backhaul link for the IAB node, or a downward backhaul link for the IAB node.

For the concept of IAB for mobile situations, the IAB donor (called DU or gNB-DU), will be connected to IAB-node, which is mobile. In this case, the type of IAB-node may be a communication module mounted on a vehicle, serving as an IAB-node for UEs.

Hereinafter, cell selection criterion is described.

The cell selection criterion S may be fulfilled when Srxlev>0 AND Squal>0. The Srxlev may be defined as $Srxlev = Q_{rxlevmeas} - (Q_{rxlevmin} + Q_{rxlevminoffset}) - P_{compensation} - Qoffset_{temp}$. The Squal may be defined as $Squal = Q_{qualmeas} - (Q_{qualmin} + Q_{qualminoffset}) - Qoffset_{temp}$. The parameters may be defined as table 3 below:

TABLE 3

| | |
|---|---|
| Srxlev | Cell selection RX level value (dB) |
| Squal | Cell selection quality value (dB) |
| $Qoffset_{temp}$ | Offset temporarily applied to a cell |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell. else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |
| $P_{compensation}$ | For FR1, if the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass}) - \min(P_{EMAX1}, P_{PowerClass}))$ (dB); |

TABLE 3-continued

| | |
|---|---|
| | else:<br>max($P_{EMAX1}$-$P_{PowerClass}$, 0) (dB)<br>For FR2, $P_{compensation}$ is set to 0. |
| $P_{EMAX1}$, $P_{EMAX2}$ | Maximum TX power level of a UE may use when transmitting on the uplink in the cell (dBm) defined as $P_{EMAX}$. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and SIB4 for normal UL. |
| $P_{PowerClass}$ | Maximum RF output power of the UE (dBm) according to the UE power class. |

The signalled values $Q_{rxlevminoffset}$ and $Q_{qualminoffset}$ may be only applied when a cell is evaluated for cell selection as a result of a periodic search for a higher priority PLMN while camped normally in a VPLMN. During this periodic search for higher priority PLMN, the UE may check the S criteria of a cell using parameter values stored from a different cell of this higher priority PLMN. Hereinafter, NR Inter-frequency and inter-RAT Cell Reselection criteria are described.

If threshServingLowQ is broadcast in system information and more than 1 second has elapsed since the UE camped on the current serving cell, cell reselection to a cell on a higher priority NR frequency or inter-RAT frequency than the serving frequency shall be performed if a cell of a higher priority NR or EUTRAN RAT/frequency fulfils Squal>Thresh$_{X, HighQ}$ during a time interval Treselection$_{RAT}$.

Otherwise, cell reselection to a cell on a higher priority NR frequency or inter-RAT frequency than the serving frequency shall be performed if i) a cell of a higher priority RAT/frequency fulfils Srxlev>Thresh$_{X, HighP}$ during a time interval Treselection$_{RAT}$; and ii) more than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if the serving cell fulfils Squal<Thresh$_{Serving, LowQ}$ and a cell of a lower priority NR or E-UTRAN RAT/frequency fulfils Squal>Thresh$_{X, LowQ}$ during a time interval Treselection$_{RAT}$.

Otherwise, cell reselection to a cell on a lower priority NR frequency or inter-RAT frequency than the serving frequency shall be performed if i) the serving cell fulfils Srxlev<Thresh$_{Serving, LowP}$ and a cell of a lower priority RAT/frequency fulfils Srxlev>Thresh$_{X, LowP}$ during a time interval Treselection$_{RAT}$; and ii) more than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:
If the highest-priority frequency is an NR frequency, the highest ranked cell among the cells on the highest priority frequency(ies) meeting the intra-frequency and equal priority inter-frequency cell reselection criteria that will be described later.

If the highest-priority frequency is from another RAT, the strongest cell among the cells on the highest priority frequency(ies) meeting the criteria of that RAT.

Hereinafter, intra-frequency and equal priority inter-frequency cell reselection criteria are described.

The cell-ranking criterion $R_s$ for serving cell may be defined by $R_s = Q_{meas,s} + Q_{hyst} - Qoffset_{temp}$. The cell-ranking criterion $R_n$ for neighboring cells may be defined by $R_n = Q_{meas,n} - Qoffset - Qoffset_{temp}$. The parameters may be defined as table 4 below:

TABLE 4

| | |
|---|---|
| $Q_{meas}$ | RSRP measurement quantity used in cell reselections. |
| Qoffset | For intra-frequency: Equals to Qoffset$_{s,n}$, if Qoffset$_{s,n}$ is valid, otherwise this equals to zero. For inter-frequency: Equals to Qoffset$_{s,n}$ plus Qoffset$_{frequency}$, if Qoffset$_{s,n}$ is valid, otherwise this equals to Qoffset$_{frequency}$ |
| Qoffset$_{temp}$ | Offset temporarily applied to a cell. |

The UE shall perform ranking of all cells that fulfil the cell selection criterion S. The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall not consider this cell and, for operation in licensed spectrum, other cells on the same frequency as candidates for reselection for a maximum of 300 seconds.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall not consider this cell and, for operation in licensed spectrum, other cells on the same frequency as candidates for reselection for a maximum of 300 seconds.

In all cases, the UE shall reselect the new cell, only if the following conditions are met:
the new cell is better than the serving cell according to the cell reselection criteria specified above during a time interval Treselection$_{RAT}$; and/or
more than 1 second has elapsed since the UE camped on the current serving cell.

If rangeToBestCell is configured but absThreshSS-BlocksConsolidation is not configured on an NR frequency, the UE may consider that there is one beam above the threshold for each cell on that frequency.

The disclosure is intended to address an efficient cell selection/reselection method for UEs moving with or along a V-IAB-node (similarity in movement behavior, if any, to select and move together with no or less handover burdens).

Figure 10:
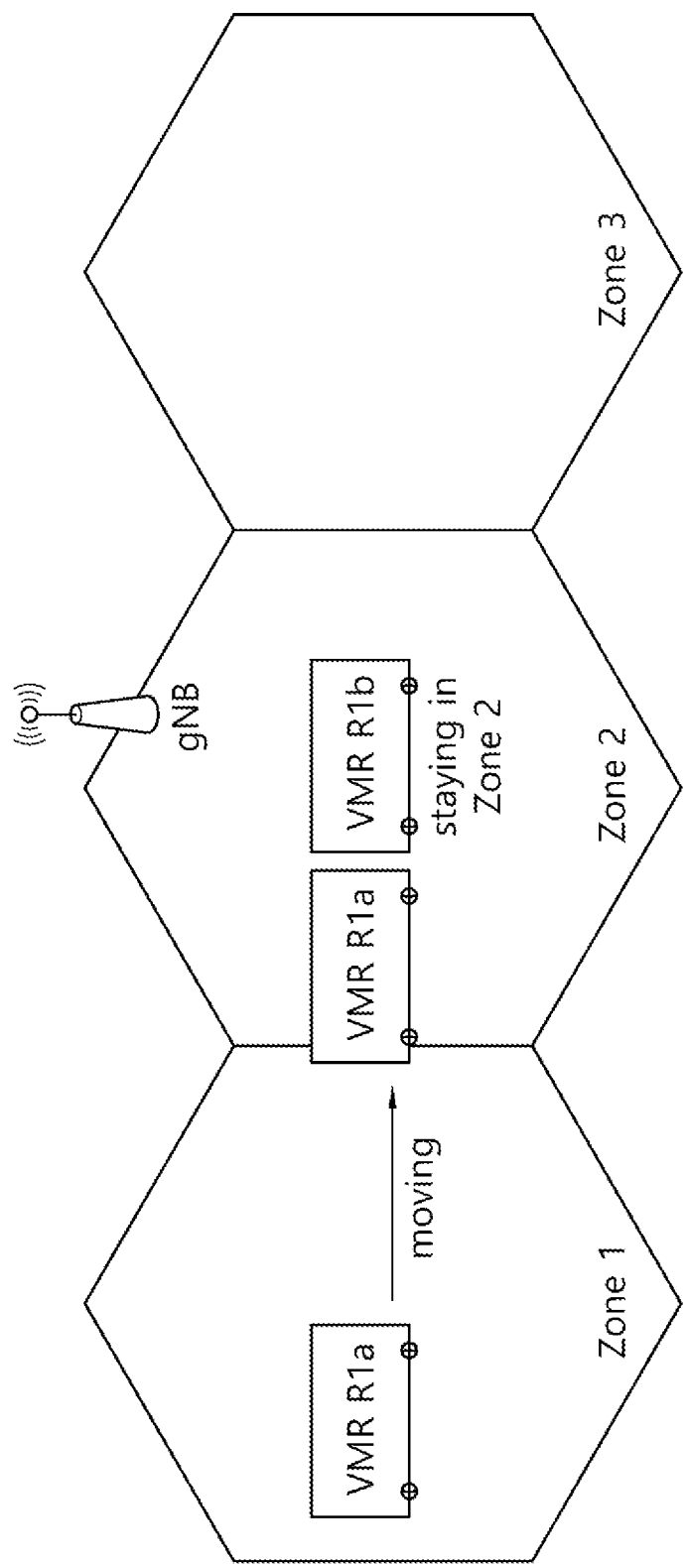
FIG. 10 shows an example of a scenario for performing a cell selection/reselection of one or more VMRs to which technical features of the present disclosure can be applied

FIG. 10 shows an example of a scenario for performing a cell selection/reselection of one or more VMRs to which technical features of the present disclosure can be applied In FIG. 10, VMR R1a may be subscribed to or owned by PLMN1 operator, and 'working' with PLMN1. VMR R1b may also be subscribed to or owned by PLMN1 operator, and 'working' with PLMN1. VMR R2 may be subscribed to or owned by PLMN2 operator, and 'working' with PLMN2. VMR working with a PLMN may mean that a VMR is serving or is ready to serve UEs within the PLMN (operator) which the VMR is subscribed to.

UE1a and UE1b may be subscribed to PLMN1 operator. VMR R1a may reside in Zone 1 whereas VMR R1b may reside in Zone 2. A Zone may be an area, but may not necessarily be an area where a UE can be directly (e.g., without any intermediate relaying node) covered by an eNB/gNB.

UE1a may be on VMR R1a whereas UE1b may be on VMR R1b. VMR R1b may have a traffic congestion and UE1b may be one of the heaviest user of VMR R1b in traffic. Zone 2 may be covered by a gNB (of PLMN1). This may mean that VMRs residing in Zone 2 are closer to this gNB than any other VMRs residing outside Zone 2.

In the above situation, the following steps 1~5 may be performed:

Step 1) VMRs may share their location information so that UEs around the respective VMRs can get aware of the location information. The geographic accuracy and timeliness of the location information would be up to different usage scenarios and up to implementation.

Step 2) VMR R1a may move from Zone 1 into Zone 2 whereas VMR R1b may stay on in Zone 2, staying in the proximity of VMR R1b.

Step 3) UE1a may try to initiate a session. UE1a may perform estimation to select which VMRs to access first based on the location information and attempt to access VMR R1a first instead of VMR R1b. UE1 may get connected to VMR R1a (if available).

Step 4) VMR R1b may recommend UE1b to (temporarily) use another VMR (or gNB) if available.

Step 5) UE1b (temporarily) may be going on to VMR R1a and VMR R1b may have (temporary) relief of congestion.

UE1a may continue travelling with VMR R1a. There may be no need to make a handover for UE1a to other VMR or to other gNB as long as the connectivity provided by VMR R1a is good enough.

To support the scenario as illustrated in FIG. 10, one or more of the following potential requirements may be needed:

VMR R1a broadcasts MasterInformationBlock (MIB) and SystemInformationBlocks (SIBs).
SIBs include SIB1 and other SIB's such as those called SI (System Information) messages, such as SIB2.
UE shall perform measurements for cell selection and reselection purposes.
VMR shall be able to provide location information to the UEs which it provides 3GPP transport for (e.g., every 1 s).
A UE served by a VMR shall be able to use location information directly provided by the serving VMR.
VMR shall be able to recommend a UE to move to another VMR, if available.
VMR shall be able to forcedly push a UE to another VMR, if available.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
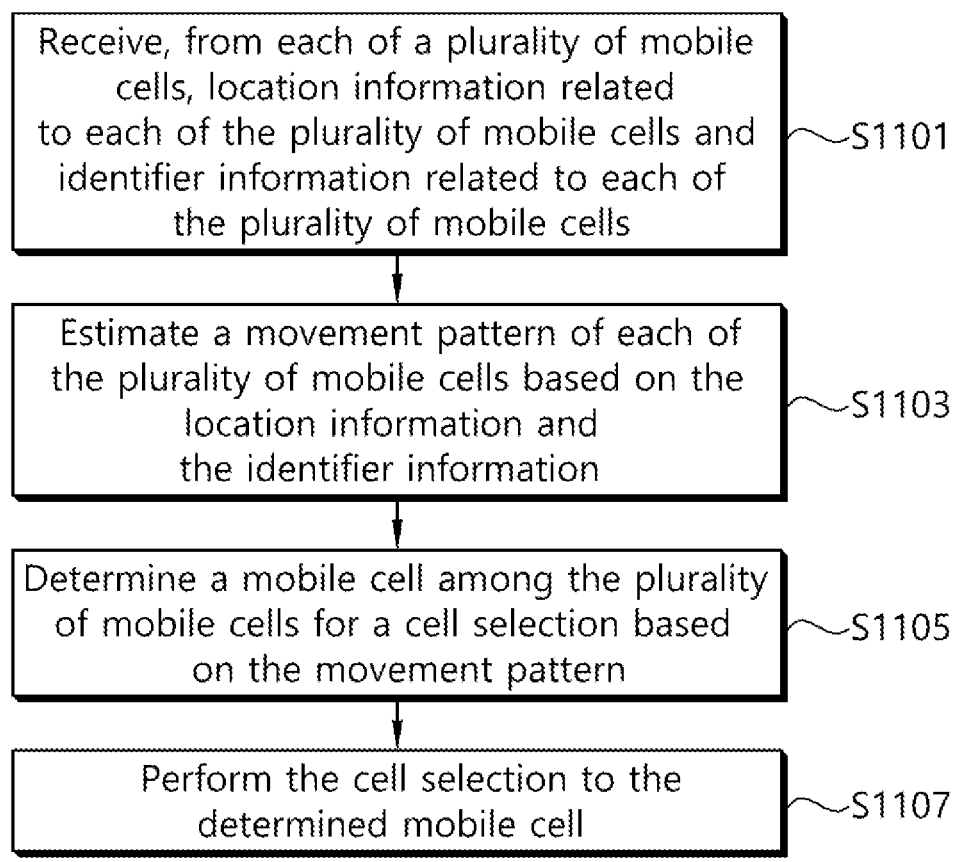
FIG. 11 shows an example of a method for performing a cell selection to a mobile cell according to an embodiment of the present disclosure.

FIG. 11 shows an example of a method for performing a cell selection to a mobile cell according to an embodiment of the present disclosure. Steps illustrated in FIG. 11 may be performed by a wireless device and/or a UE.

Referring to FIG. 11, in step S1101, the wireless device may receive, from each of a plurality of mobile cells, location information related to each of the plurality of mobile cells and identifier (ID) information related to each of the plurality of mobile cells.

In step S1103, the wireless device may estimate a movement pattern of each of the plurality of mobile cells based on the location information and the identifier information.

In step S1105, the wireless device may determine a mobile cell among the plurality of mobile cells for a cell selection based on the movement pattern.

In step S1107, the wireless device may perform the cell selection to the determined mobile cell.

According to various embodiments, to estimate the movement pattern, the wireless device may determine a displacement of each mobile cell within a given time interval based on location information related to each mobile cell. The wireless device may determine a displacement of the wireless device within the given time interval. The wireless device may determine a difference in a distance between the wireless device and each mobile cell within the given time interval based on ID information related to each mobile cell. The wireless device may determine a similarity of movement pattern to each mobile cell based on the displacement of each mobile cell within the given time interval, the displacement of the wireless device within the given time interval and the difference in the distance between the wireless device and each mobile cell within the given time interval.

According to various embodiments, the wireless device may determine the mobile cell to which the movement similarity is largest among the plurality of mobile cells.

According to various embodiments, the determined mobile cell may be is related to a vehicle mobile relay (VMR) node which carries the wireless device.

According to various embodiments, the location information may be received from each mobile cell on a periodic basis.

According to various embodiments, the wireless device may receive, from each mobile cell, RAT information comprising an ID of each mobile cell and first location information related to the ID. The wireless device may receive, from each mobile cell, RAT information comprising the ID and second location information related to the ID after a period of time from when the first location information is received. The wireless device may store the first location information and the second location information to obtain history information related to the ID. The history information may comprise the first location information and the second location information.

According to various embodiments, the first location information may indicate location information of a mobile cell related to the ID at a first time. The second location information may indicate location information of the mobile cell related to the ID at a second time after the period of time from the first time.

According to various embodiments, the movement pattern of each mobile cell may be estimated based on the history information.

According to various embodiments, the determined mobile cell may be related to a largest amount of history information among the plurality of mobile cells.

According to various embodiments, the determined mobile cell may be a suitable cell on which the wireless device is able to camp.

According to various embodiments, the wireless device may determine whether the determined mobile cell satisfies a cell selection criterion. The wireless device may perform the cell selection to the determined mobile cell based on the fact that the determined mobile cell satisfies the cell selection criterion.

According to various embodiments, the wireless device may determine whether the determined mobile cell satisfies a cell selection criterion. The wireless device may identify another mobile cell which satisfies the cell selection criterion based on the fact that the determined mobile cell does not satisfy the cell selection criterion. The wireless device may perform the cell selection to the identified another mobile cell.

According to various embodiments, after performing the cell selection to the determined mobile cell, the wireless device may perform a cell reselection to another mobile cell to which a similarity of movement pattern is largest among a plurality of candidate mobile cells. For example, candidate mobile cell may be a mobile cell for which the wireless device has stored history information.

Figure 12:
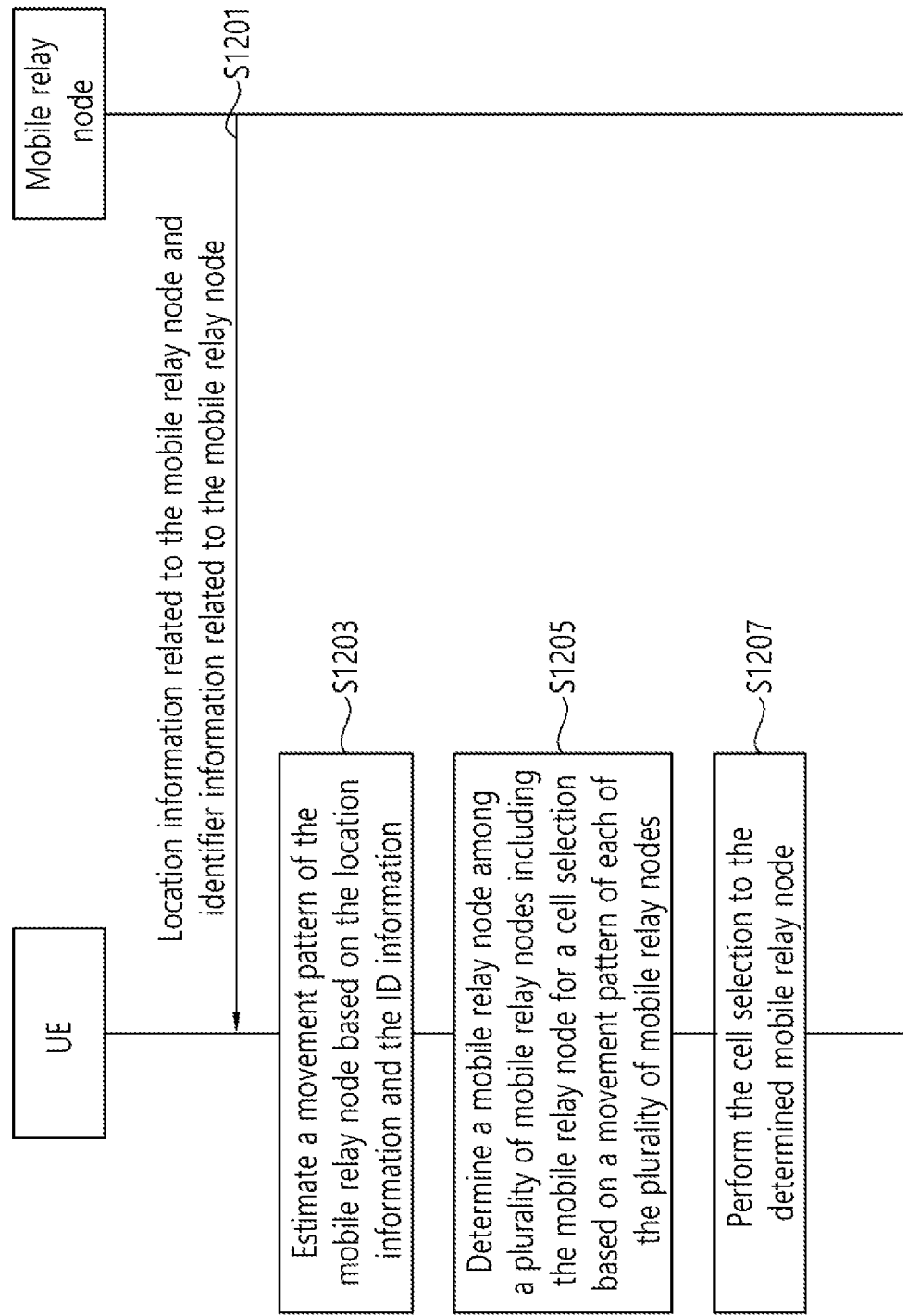
FIG. 12 shows an example of a signal flow for performing a cell selection to a mobile cell according to an embodiment of the present disclosure.

FIG. 12 shows an example of a signal flow for performing a cell selection to a mobile cell according to an embodiment of the present disclosure. In the signal flow, a UE and a mobile relay node may be involved.

Referring to FIG. 12, in step S1201, the mobile relay node may transmit, to the UE, location information related to the mobile relay node and identifier information related to the mobile relay node.

In step S1203, the UE may estimate a movement pattern of the mobile relay node based on the location information and the ID information.

In step S1205, the UE may determine a mobile relay node among a plurality of mobile relay nodes including the mobile relay node for a cell selection based on a movement pattern of each of the plurality of mobile relay nodes.

In step S1207, the UE may perform the cell selection to the determined mobile relay node.

In the disclosure, UE shall perform measurements for cell selection and reselection purposes.

When evaluating Srxlev and Squal of non-serving cells for reselection evaluation purposes, the UE shall use parameters provided by the serving cell and for the final check on cell selection criterion, the UE shall use parameters provided by the target cell for cell reselection.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on RRC_IDLE or RRC_INACTIVE state measurements and cell selection criteria.

In order to expedite the cell selection process, stored information for several radio access technologies (RATs) (i.e., RAT information), if available, may be used by the UE.

According to various embodiments, each VMR may provide information (e.g., RAT information) by which UE can estimate or determine similarity of a moving behaviour of the UE with a particular VMR so that the UE can select the most relevant VMR.

According to various embodiments, when one or more other VMRs become available, a VMR that serves a specific UE can push the UE or recommend the UE to go to another available VMR temporarily or permanently. This may be referred to as a temporary forced handover.

In order for a UE to get connected to the VMR (V-IAB-node) which moves together (e.g., a UE rides on a vehicle providing VMR (or V-IAB-node) functionality toward the UE), the UE may store the recent history of RAT information received.

The types of RAT information or RAT information may include location information (high accuracy or regular) with periodic updates (e.g., 1 sec, or 5 sec), identifiers (IDs) (any types of identifiers) that VMR broadcasts, by which the UE in the proximity can get aware that a specific VMR has tendency of moving together with this UE. Then, the UE can select that particular VMR to initiate a session among the VMR and one or more other VMRs, if any, at first.

If the VMR (or V-IAB-node) is moving together with a certain UE, the UE may contain a series of information for a certain period of time.

When camped on a cell, the UE shall regularly search for a better cell according to the cell reselection criteria. If a better cell is found, that cell may be selected. The change of cell may imply a change of RAT.

The NAS may be informed of whether the cell selection and reselection result in changes in the received system information relevant for NAS.

For normal service, the UE shall camp on a suitable cell, monitor control channel(s) of that cell so that the UE can:
receive system information from the PLMN; and
receive registration area information from the PLMN, e.g., tracking area information; and
receive other AS and NAS Information; and
if registered:
receive paging and notification messages from the PLMN; and
initiate transfer to Connected mode.

For cell selection in multi-beam operations, measurement quantity of a cell may be up to UE implementation.

For cell reselection in multi-beam operations, including inter-RAT reselection from E-UTRA to NR, the measurement quantity of this cell may be derived amongst the beams corresponding to the same cell based on SS/PBCH block as follows:
if nrofSS-BlocksToAverage (maxRS-IndexCellQual in E-UTRA) is not configured in SIB2/SIB4 (SIB24 in E-UTRA); or
if absThreshSS-BlocksConsolidation (threshRS-Index in E-UTRA) is not configured in SIB2/SIB4 (SIB24 in E-UTRA); or
if the highest beam measurement quantity value is below or equal to absThreshSS-Blocks Consolidation (threshRS-Index in E-UTRA):
derive a cell measurement quantity as the highest beam measurement quantity value.
else:
derive a cell measurement quantity as the linear average of the power values of up to nrofSS-BlocksToAverage (maxRS-IndexCellQual in E-UTRA) of highest beam measurement quantity values above absThreshSS-BlocksConsolidation (threshRS-Index in E-UTRA).

Figure 13:
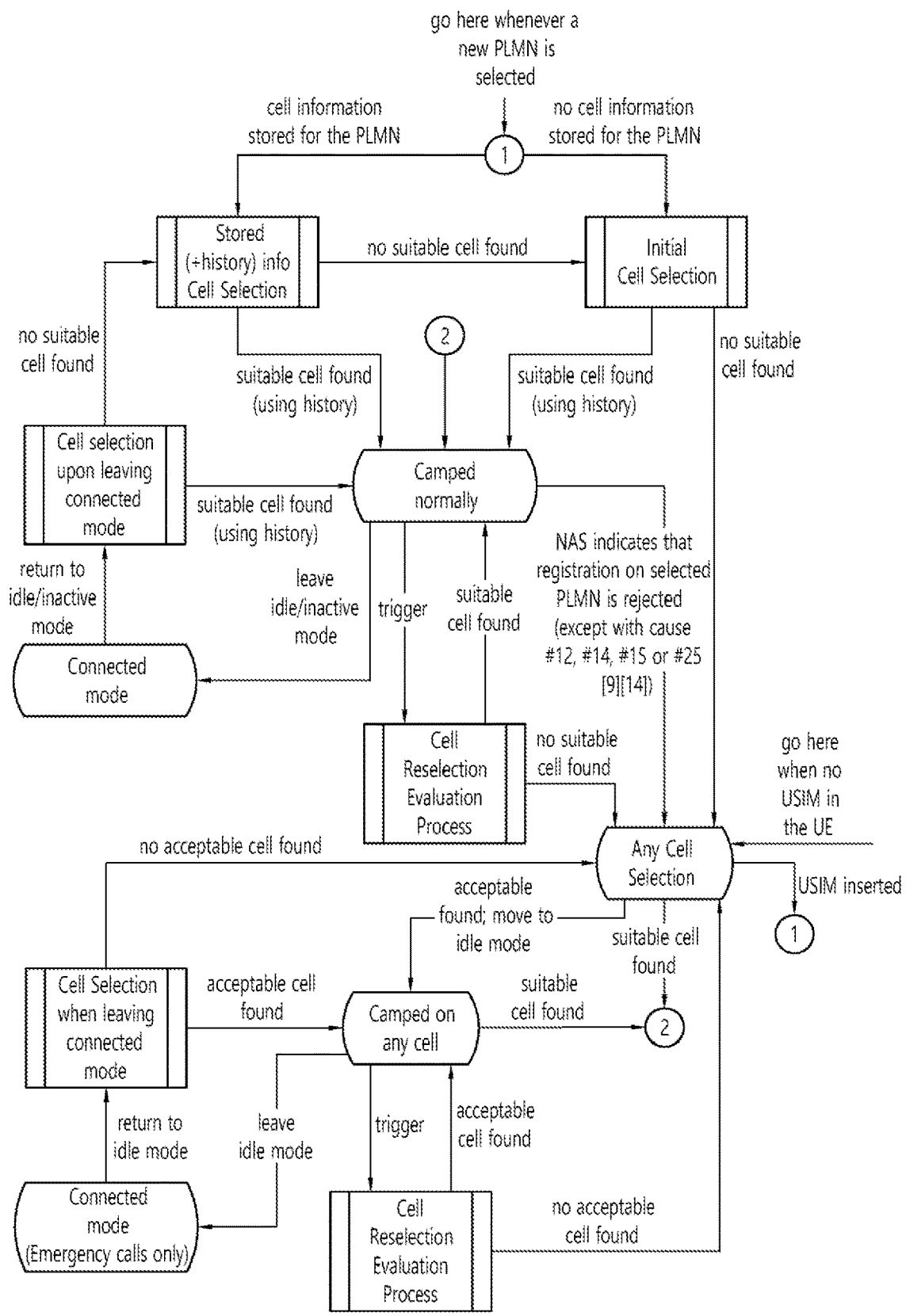
FIG. 13 shows an example of states and state transitions to select a mobile relay node according to an embodiment of the present disclosure.

FIG. 13 shows an example of states and state transitions to select a mobile relay node according to an embodiment of the present disclosure.

More specifically, FIG. 13 shows states and state transitions and procedures in RRC_IDLE and RRC_INACTIVE using recent history information for UEs to select a mobile relay node (i.e., mobile cell, VMR and/or V-IAB node). Whenever a new PLMN selection is performed, the PLMN selection may cause an exit to number 1.

Cell selection may be performed by one of the following two procedures a) and b):

a) Initial cell selection (no prior knowledge of which RF channels are NR frequencies):
1. The UE shall scan all RF channels in the NR bands according to its capabilities to find a suitable cell.
2. On each frequency, the UE may need only search for the strongest cell.
3. Once a suitable cell is found using recent history information (for that UE to select which VMR node), this cell shall be selected.

b) Cell selection by leveraging stored information:
1. This procedure may require stored information of frequencies and optionally also information on cell parameters from previously received measurement control information elements or from previously detected cells.
2. Once the UE has found a suitable cell using recent history information (for that UE to select which VMR node), the UE shall select the suitable cell.
3. If no suitable cell is found, the initial cell selection procedure in a) shall be started.

Priorities between different frequencies or RATs provided to the UE by system information or dedicated signalling may not be used in the cell selection process.

UE shall check the recent history information to check if there is any VMR (or V-IAB-node) moving along the UE. If exists, the UE shall check if cell selection criterion S to see if the VMR (or V-IAB-node) is good enough to get connected (or also to check if the VMR (or V-IAB-node) is not good enough). If "good enough", the UE shall select that VMR (or V-IAB-node). Otherwise, the UE shall perform another VMR according to cell selection criterion S.

Hereinafter, a wireless device in a wireless communication system, according to some embodiments of the present disclosure, will be described.

For example, the wireless device may include at least one processor, a transceiver, and a memory. The at least one processor may be configured to be coupled operably with the memory and the transceiver.

According to various embodiments, the at least one processor may be configured to control the transceiver to receive, from each of a plurality of mobile cells, location information related to each of the plurality of mobile cells and identifier (ID) information related to each of the plurality of mobile cells. The at least one processor may be configured to estimate a movement pattern of each of the plurality of mobile cells based on the location information and the identifier information. The at least one processor may be configured to determine a mobile cell among the plurality of mobile cells for a cell selection based on the movement pattern. The at least one processor may be configured to perform the cell selection to the determined mobile cell.

According to various embodiments, the at least one processor may be configured to determine a displacement of each mobile cell within a given time interval based on location information related to each mobile cell. The at least one processor may be configured to determine a displacement of the wireless device within the given time interval. The at least one processor may be configured to determine a difference in a distance between the wireless device and each mobile cell within the given time interval based on ID information related to each mobile cell. The at least one processor may be configured to determine a similarity of movement pattern to each mobile cell based on the displacement of each mobile cell within the given time interval, the displacement of the wireless device within the given time interval and the difference in the distance between the wireless device and each mobile cell within the given time interval.

According to various embodiments, the at least one processor may be configured to determine the mobile cell to which the movement similarity is largest among the plurality of mobile cells.

According to various embodiments, the determined mobile cell may be is related to a vehicle mobile relay (VMR) node which carries the wireless device.

According to various embodiments, the location information may be received from each mobile cell on a periodic basis.

According to various embodiments, the at least one processor may be configured to control the transceiver to receive, from each mobile cell, RAT information comprising an ID of each mobile cell and first location information related to the ID. The at least one processor may be configured to control the transceiver to receive, from each mobile cell, RAT information comprising the ID and second location information related to the ID after a period of time from when the first location information is received. The at least one processor may be configured to store the first location information and the second location information to obtain history information related to the ID. The history information may comprise the first location information and the second location information.

According to various embodiments, the first location information may indicate location information of a mobile cell related to the ID at a first time. The second location information may indicate location information of the mobile cell related to the ID at a second time after the period of time from the first time.

According to various embodiments, the movement pattern of each mobile cell may be estimated based on the history information.

According to various embodiments, the determined mobile cell may be related to a largest amount of history information among the plurality of mobile cells.

According to various embodiments, the determined mobile cell may be a suitable cell on which the wireless device is able to camp.

According to various embodiments, the at least one processor may be configured to determine whether the determined mobile cell satisfies a cell selection criterion. The at least one processor may be configured to perform the cell selection to the determined mobile cell based on the fact that the determined mobile cell satisfies the cell selection criterion.

According to various embodiments, the at least one processor may be configured to determine whether the determined mobile cell satisfies a cell selection criterion. The at least one processor may be configured to identify another mobile cell which satisfies the cell selection criterion based on the fact that the determined mobile cell does not satisfy the cell selection criterion. The at least one processor may be configured to perform the cell selection to the identified another mobile cell.

According to various embodiments, after performing the cell selection to the determined mobile cell, the at least one processor may be configured to perform a cell reselection to another mobile cell to which a similarity of movement pattern is the largest among a plurality of candidate mobile cells. For example, candidate mobile cell may be a mobile cell for which the wireless device has stored history information.

Hereinafter, a mobile relay node in a wireless communication system, according to some embodiments of the present disclosure, will be described.

For example, the mobile relay node may include at least one processor, a transceiver, and a memory. The at least one processor may be configured to be coupled operably with the memory and the transceiver.

According to various embodiments, the at least one processor may be configured to control the transceiver to transmit, to the wireless device, location information related to the mobile relay node and identifier information related to the mobile relay node. The wireless device may estimate a movement pattern of the mobile relay node based on the location information and the ID information. The wireless device may determine a mobile relay node among a plurality of mobile relay nodes including the mobile relay node for a cell selection based on a movement pattern of each of the plurality of mobile relay nodes. The wireless device may perform the cell selection to the determined mobile relay node.

Hereinafter, a processor for a wireless device in a wireless communication system, according to some embodiments of the present disclosure, will be described.

The processor may be configured to receive, from each of a plurality of mobile cells, location information related to each of the plurality of mobile cells and identifier (ID) information related to each of the plurality of mobile cells. The processor may be configured to estimate a movement pattern of each of the plurality of mobile cells based on the location information and the identifier information. The processor may be configured to determine a mobile cell among the plurality of mobile cells for a cell selection based on the movement pattern. The processor may be configured to perform the cell selection to the determined mobile cell.

Hereinafter, a non-transitory computer-readable medium has stored thereon a plurality of instructions for a wireless device in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of the wireless device.

The stored a plurality of instructions may cause the wireless device to receive, from each of a plurality of mobile cells, location information related to each of the plurality of mobile cells and identifier (ID) information related to each of the plurality of mobile cells. The stored a plurality of instructions may cause the wireless device to estimate a movement pattern of each of the plurality of mobile cells based on the location information and the identifier information. The stored a plurality of instructions may cause the wireless device to determine a mobile cell among the plurality of mobile cells for a cell selection based on the movement pattern. The stored a plurality of instructions may cause the wireless device to perform the cell selection to the determined mobile cell.

The present disclosure may have various advantageous effects.

For example, mobility management can be optimized by considering a cell selection/reselection based on history information/movement pattern between a VMR and a UE in the VMR.

For example, load balancing can be achieved by adaptively overcoming an unbalanced geographic distribution of traffic demand due to a mobility of VMRs and UEs in the VMR.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
receiving, from each of a plurality of mobile cells, location information related to each of the plurality of mobile cells and identifier (ID) information related to each of the plurality of mobile cells;
estimating a movement pattern of each of the plurality of mobile cells based on the location information and the identifier information;
determining a mobile cell among the plurality of mobile cells for a cell selection based on the movement pattern; and
performing the cell selection to the determined mobile cell,
wherein the cell selection to the mobile cell is determined based on a cell selection reception (RX) level for the mobile cell and a cell selection quality value for the mobile cell,
wherein the cell selection RX level is determined based on at least one of:
an offset temporarily applied to the mobile cell;
a measured cell RX level value for the mobile cell;
a minimum required RX level in the mobile cell; or
an offset to the minimum required RX level in the mobile cell, and
wherein the cell selection quality value for the mobile cell is determined based on at least one of:
an offset temporarily applied to the mobile cell;
a measured cell quality value for the mobile cell;
a minimum required quality level in the mobile cell; or
an offset to the minimum required quality level in the mobile cell.

2. The method of claim 1, wherein the estimating the movement pattern comprises:
determining a displacement of each mobile cell within a given time interval based on location information related to each mobile cell;
determining a displacement of the wireless device within the given time interval;
determining a difference in a distance between the wireless device and each mobile cell within the given time interval based on ID information related to each mobile cell; and
determining a similarity of movement pattern to each mobile cell based on the displacement of each mobile cell within the given time interval, the displacement of the wireless device within the given time interval and the difference in the distance between the wireless device and each mobile cell within the given time interval.

3. The method of claim 1, wherein the determined mobile cell is a mobile cell to which a similarity of movement pattern is largest among the plurality of mobile cells.

4. The method of claim 1, wherein the location information is received from each mobile cell on a periodic basis.

5. The method of claim 1, further comprising:
receiving, from each mobile cell, information comprising an ID of each mobile cell and first location information related to the ID;
receiving, from each mobile cell, information comprising the ID and second location information related to the ID after a period of time from when the first location information is received; and
storing the first location information and the second location information to obtain history information related to the ID,
wherein the history information comprises the first location information and the second location information.

6. The method of claim 5, wherein the first location information indicates location information of a mobile cell related to the ID at a first time, and
wherein the second location information indicates location information of the mobile cell related to the ID at a second time after the period of time from the first time.

7. The method of claim 5, wherein the movement pattern of each mobile cell is estimated based on the history information.

8. The method of claim 5, wherein the determined mobile cell is related to a largest amount of history information among the plurality of mobile cells.

9. The method of claim 1, wherein the determined mobile cell is a suitable cell on which the wireless device is able to camp.

10. The method of claim 1, further comprising:
determining whether the determined mobile cell satisfies a cell selection criterion,
wherein the performing of the cell selection comprises performing the cell selection to the determined mobile cell based on the fact that the determined mobile cell satisfies the cell selection criterion.

11. The method of claim 1, further comprising:
determining whether the determined mobile cell satisfies a cell selection criterion;
identifying another mobile cell which satisfies the cell selection criterion based on the fact that the determined mobile cell does not satisfy the cell selection criterion; and
performing the cell selection to the identified another mobile cell.

12. The method of claim 1, further comprising:
after performing the cell selection to the determined mobile cell, performing a cell reselection to another mobile cell to which a similarity of movement pattern is the largest among a plurality of candidate mobile cells.

13. The method of claim 1, wherein the wireless device is in communication with at least one of a user equipment, a network, or autonomous vehicles other than the wireless device.

14. A wireless device in a wireless communication system comprising:
a transceiver;
a memory; and
at least one processor operatively coupled to the transceiver and the memory, and configured to:
control the transceiver to receive, from each of a plurality of mobile cells, location information related to each of the plurality of mobile cells and identifier (ID) information related to each of the plurality of mobile cells;
determine a movement pattern of each of the plurality of mobile cells based on the location information and the identifier information;
determine a mobile cell among the plurality of mobile cells for a cell selection based on the movement pattern; and
perform the cell selection to the determined mobile cell, wherein the cell selection to the mobile cell is determined based on a cell selection reception (RX) level for the mobile cell and a cell selection quality value for the mobile cell;

wherein the cell selection RX level is determined based on at least one of:

an offset temporarily applied to the mobile cell;

a measured cell RX level value for the mobile cell;

a minimum required RX level in the mobile cell; or an offset to the minimum required RX level in the mobile cell, and wherein the cell selection quality value for the mobile cell is determined based on at least one of:

an offset temporarily applied to the mobile cell;

a measured cell quality value for the mobile cell;

a minimum required quality level in the mobile cell; or an offset to the minimum required quality level in the mobile cell.

15. A computer-readable medium having recorded thereon a program for performing each step of a method on a computer, the method comprising:

receiving, from each of a plurality of mobile cells, location information related to each of the plurality of mobile cells and identifier (ID) information related to each of the plurality of mobile cells;

determining a movement pattern of each of the plurality of mobile cells based on the location information and the identifier information;

determining a mobile cell among the plurality of mobile cells for a cell selection based on the movement pattern; and performing the cell selection to the determined mobile cell, wherein the cell selection to the mobile cell is determined based on a cell selection reception (RX) level for the mobile cell and a cell selection quality value for the mobile cell, wherein the cell selection RX level is determined based on at least one of:

an offset temporarily applied to the mobile cell;

a measured cell RX level value for the mobile cell;

a minimum required RX level in the mobile cell; or an offset to the minimum required RX level in the mobile cell, and wherein the cell selection quality value for the mobile cell is determined based on at least one of:

an offset temporarily applied to the mobile cell;

a measured cell quality value for the mobile cell;

a minimum required quality level in the mobile cell; or an offset to the minimum required quality level in the mobile cell.

* * * * *